US008600208B2

(12) United States Patent
Badar et al.

(10) Patent No.: US 8,600,208 B2
(45) Date of Patent: Dec. 3, 2013

(54) FIBER OPTIC TELECOMMUNICATIONS MODULE

(75) Inventors: Timothy G. Badar, Saint Paul, MN (US); Gustavo Garcia, Chihuahua (MX); Juan Munoz, CD Juarez (MX); Edward T. Landry, Plymouth, MN (US); Dominic J. Louwagie, Eden Prairie, MN (US); Marcelo Enrique Ruiz, CD Juarez (MX); Ricardo Armendariz, Chi (MX)

(73) Assignee: ADC Telecommunications, Inc., Berwyn, PA (US)

( * ) Notice: Subject to any disclaimer, the term of this patent is extended or adjusted under 35 U.S.C. 154(b) by 208 days.

(21) Appl. No.: 13/100,840

(22) Filed: May 4, 2011

(65) Prior Publication Data

US 2012/0051708 A1  Mar. 1, 2012

Related U.S. Application Data

(60) Provisional application No. 61/376,401, filed on Aug. 24, 2010.

(51) Int. Cl.
*G02B 6/00* (2006.01)

(52) U.S. Cl.
USPC .......................................... 385/135

(58) Field of Classification Search
USPC .......................................... 385/135
See application file for complete search history.

(56) References Cited

U.S. PATENT DOCUMENTS

| | | | |
|---|---|---|---|
| 5,011,257 A | 4/1991 | Wettengel et al. | |
| 5,127,082 A | 6/1992 | Below et al. | |
| 5,317,663 A | 5/1994 | Beard et al. | |
| 5,363,465 A | 11/1994 | Korkowski et al. | |
| 6,424,781 B1 | 7/2002 | Puetz et al. | |

(Continued)

OTHER PUBLICATIONS

ADC Telecommunications, Inc., "Value-Added Module (VAM) System—Monitor, Splitter, WDM/CWDM/DWDM Modules and Chassis—5th Edition," Oct. 2009, 32 Pages.

*Primary Examiner* — Rhonda Peace
(74) *Attorney, Agent, or Firm* — Merchant & Gould P.C.

(57) ABSTRACT

A telecommunications module includes a plurality of adapters mounted at a front face. The adapters are provided in groups of two and are stacked extending from the top to the bottom of the module. The front face of the module defines a center portion, a right portion, and a left portion. According to one embodiment, the right and the left portions are generally angled forwardly at an acute angle relative to a line that is perpendicular to the sides of the module as they extend from the center toward the right and left sides of the module. Each angled portion defines a slope as it extends from the center portion toward the right and left sides. The angled portions define a stepped configuration as they extend from the center toward the sides. Each step in the stepped configuration defines adapter receptacles that are also angled at an acute angle with respect to a line that generally defines the slope of the angle of the right and left angled portions. According to another aspect of the disclosure, the right and the left portions of the front face are generally angled rearwardly at an acute angle with respect to a line that is perpendicular to the sides of the module as they extend from the center toward the right and left sides. Stacked adapters mounted to the angled portions have longitudinal axes that are perpendicular to slopes defined by the angled portions.

22 Claims, 18 Drawing Sheets

(56) References Cited

U.S. PATENT DOCUMENTS

| | | |
|---|---|---|
| 6,535,682 B1 | 3/2003 | Puetz et al. |
| 6,537,106 B1 | 3/2003 | Follingstad |
| 6,556,763 B1 | 4/2003 | Puetz et al. |
| 6,623,170 B2 | 9/2003 | Petrillo |
| 6,736,670 B2 | 5/2004 | Clark et al. |
| 6,760,531 B1 | 7/2004 | Solheid et al. |
| 6,761,585 B2 | 7/2004 | Clark et al. |
| 6,796,717 B2 | 9/2004 | Petrillo |
| 6,901,200 B2 | 5/2005 | Schray |
| 6,916,199 B2 | 7/2005 | Follingstad |
| 7,066,771 B2 | 6/2006 | Clark et al. |
| 7,094,095 B1 * | 8/2006 | Caveney .................. 439/540.1 |
| 7,139,461 B2 | 11/2006 | Puetz et al. |
| 7,149,398 B2 | 12/2006 | Solheid et al. |
| 7,179,119 B2 | 2/2007 | Follingstad |
| 7,241,182 B2 | 7/2007 | Clark et al. |
| 7,244,144 B2 | 7/2007 | Follingstad |
| 7,333,707 B2 | 2/2008 | Puetz et al. |
| 7,335,056 B1 | 2/2008 | Clark et al. |
| 7,357,667 B2 | 4/2008 | Clark et al. |
| 7,391,952 B1 * | 6/2008 | Ugolini et al. ................ 385/135 |
| 7,416,349 B2 * | 8/2008 | Kramer .......................... 385/77 |
| 7,455,548 B2 | 11/2008 | Clark et al. |
| 7,534,135 B2 | 5/2009 | Follingstad |
| 7,544,090 B2 | 6/2009 | Follingstad |
| 7,686,658 B2 | 3/2010 | Clark et al. |
| 7,805,043 B2 | 9/2010 | Puetz et al. |
| 7,934,948 B2 | 5/2011 | Follingstad |
| 2007/0025675 A1 * | 2/2007 | Kramer ......................... 385/134 |
| 2008/0131067 A1 * | 6/2008 | Ugolini et al. ................ 385/135 |
| 2009/0041417 A1 * | 2/2009 | Rapp et al. .................... 385/135 |
| 2009/0067800 A1 * | 3/2009 | Vazquez et al. ............... 385/135 |
| 2009/0274431 A1 | 11/2009 | Krampotich et al. |
| 2010/0322576 A1 * | 12/2010 | Rhoney et al. ................ 385/134 |
| 2012/0051708 A1 * | 3/2012 | Badar et al. ................... 385/135 |

* cited by examiner

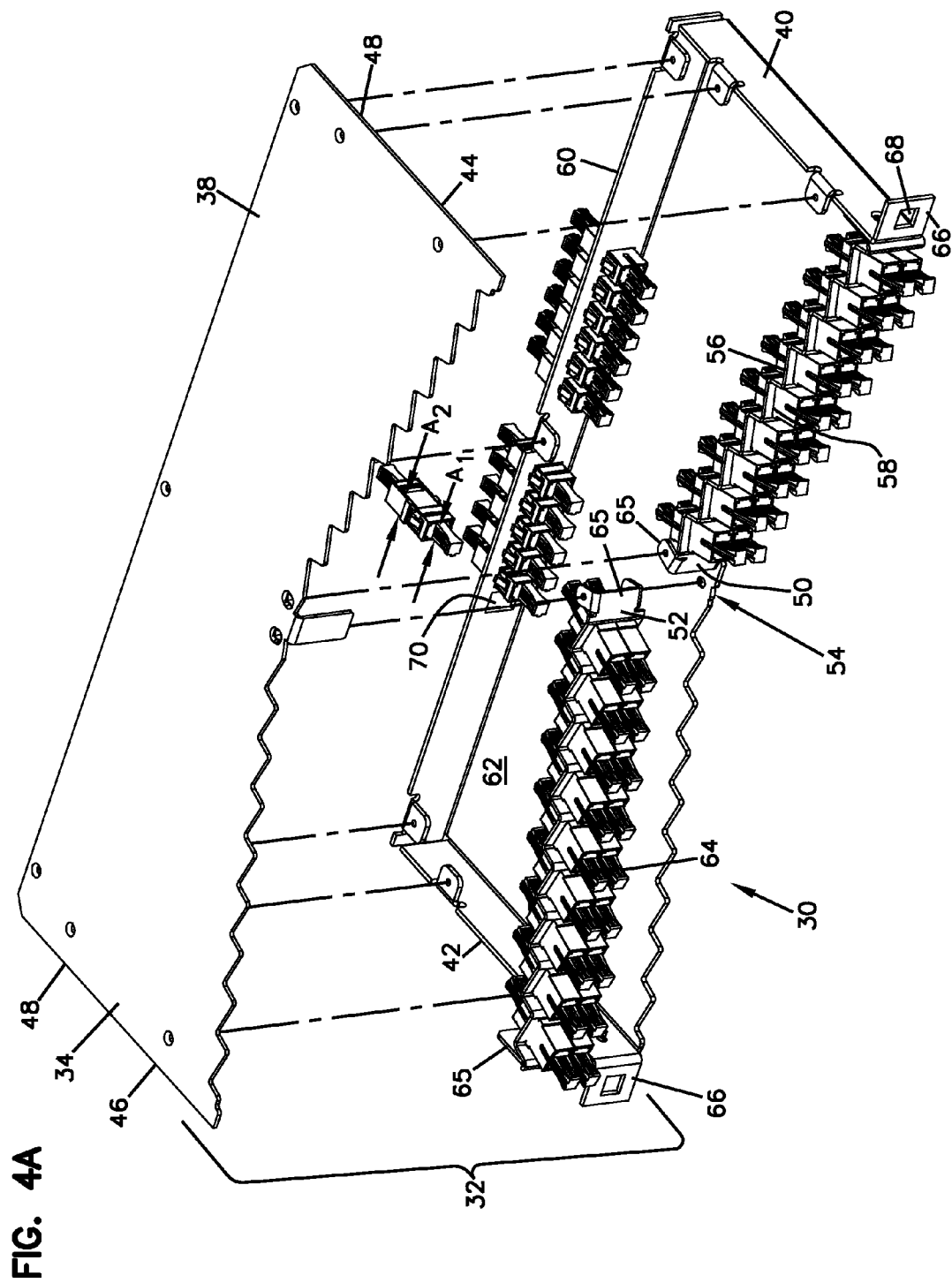

FIBER OPTIC TELECOMMUNICATIONS MODULE

CROSS REFERENCE TO RELATED APPLICATION

This application claims the benefit of U.S. Provisional Patent Application Ser. No. 61/376,401, filed Aug. 24, 2010, which application is hereby incorporated by reference in its entirety.

FIELD

The present disclosure generally relates to fiber optic telecommunications equipment. More specifically, the present disclosure relates to fiber optic modules.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters may be used to provide the connection between transmission fibers and customer fibers. While the demand for added capacity in telecommunications is growing rapidly, this demand is being met in part by increasing the density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Further improvements in adding fiber optic capacity and increasing density while achieving accessibility are desired.

SUMMARY

The present disclosure relates to a fiber optic telecommunications device. The telecommunications device is a module including a plurality of adapters mounted at a front face thereon. The adapters are provided in groups of two and are in a stacked arrangement extending from a top of the module to the bottom of the module. The front face of the module defines a center portion, a right plate, and a left plate. The right and the left plates are generally angled forwardly at an acute angle with respect to a line that is perpendicular to the sides of the module as they extend from the center of the front face toward the right and left sides of the module. Each plate generally defines a slope as it extends from the center portion toward the right and left sides of the housing. The right and left plates also define a stepped configuration as they extend from the center portion toward the sides of the module housing. Each step in the stepped configuration defines adapter receptacles that are also angled at an acute angle with respect to a line that generally defines the slope of the angle of the right and left plates of the front face.

According to another aspect of the disclosure, the right and the left plates at the front of the module are generally angled rearwardly at an acute angle with respect to a line that is perpendicular to the sides of the module as they extend from the center of the front face toward the right and left sides of the module. Each plate generally defines a slope as it extends from the center portion toward the right and left sides of the housing. The adapters are mounted to the first and second plates with the longitudinal axes of the adapters being perpendicular to the slopes defined by the first and second plates. The adapters are provided in groups of two and are in a stacked arrangement extending from a top of the module to the bottom of the module.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the disclosure and together with the detailed description, serve to explain the principles of the invention. A brief description of the drawings is as follows:

FIG. 4A illustrates a front perspective exploded view of another embodiment of a telecommunications module similar to the module shown in FIGS. 1-4, the module of FIG. 4A including a different fastening arrangement for fastening the first and second plates to the module housing;

DETAILED DESCRIPTION

Reference will now be made in detail to exemplary aspects of the present disclosure which are illustrated in the accompanying drawings. Wherever possible, the same reference numbers will be used throughout the drawings to refer to the same or similar parts.

Figure 1:
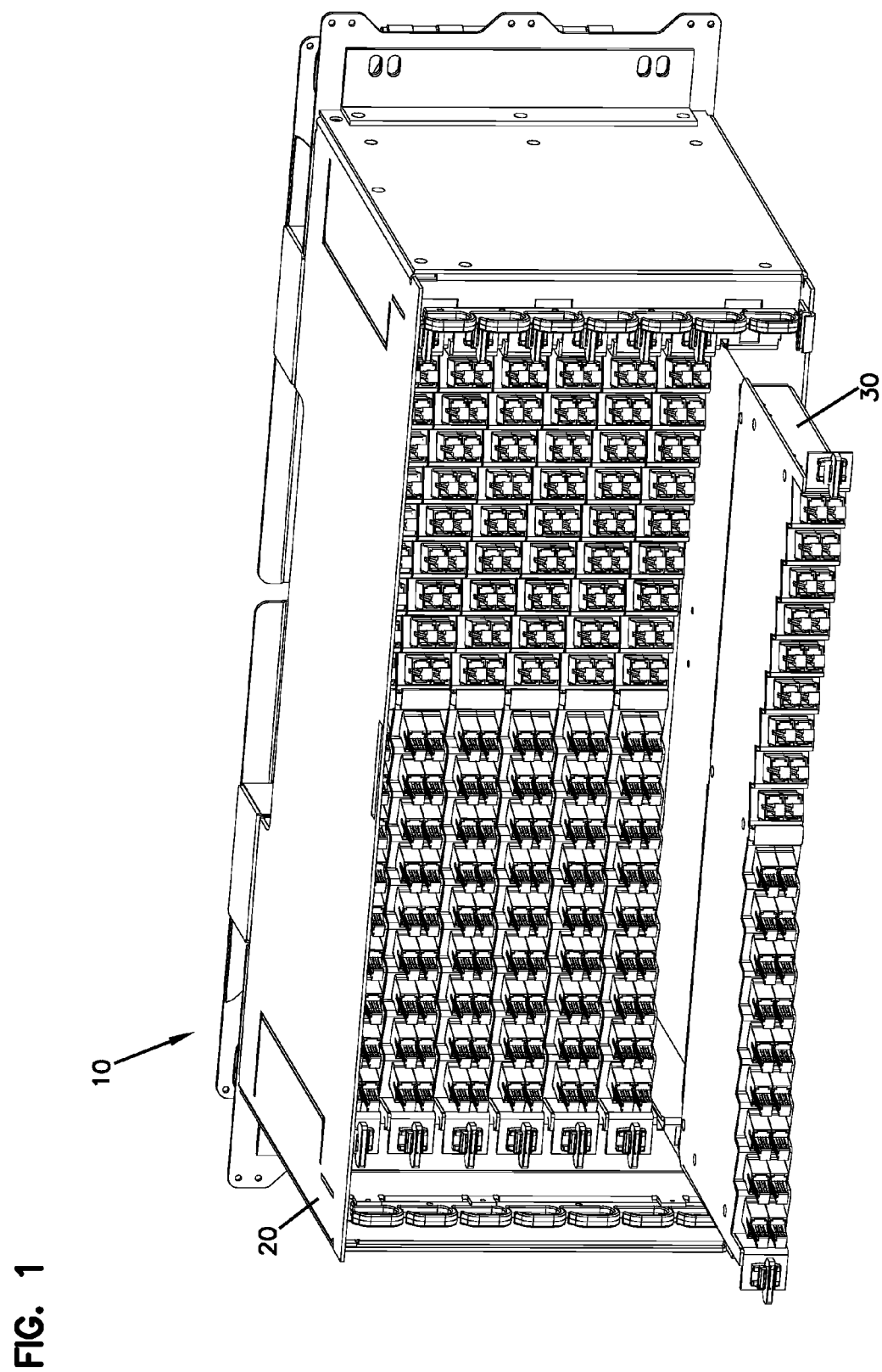
FIG. 1 is a front perspective view of a telecommunications system including a telecommunications frame with a plurality of telecommunications modules inserted therein, the telecommunications modules having features that are examples of inventive aspects according to the disclosure.
Figure 2:
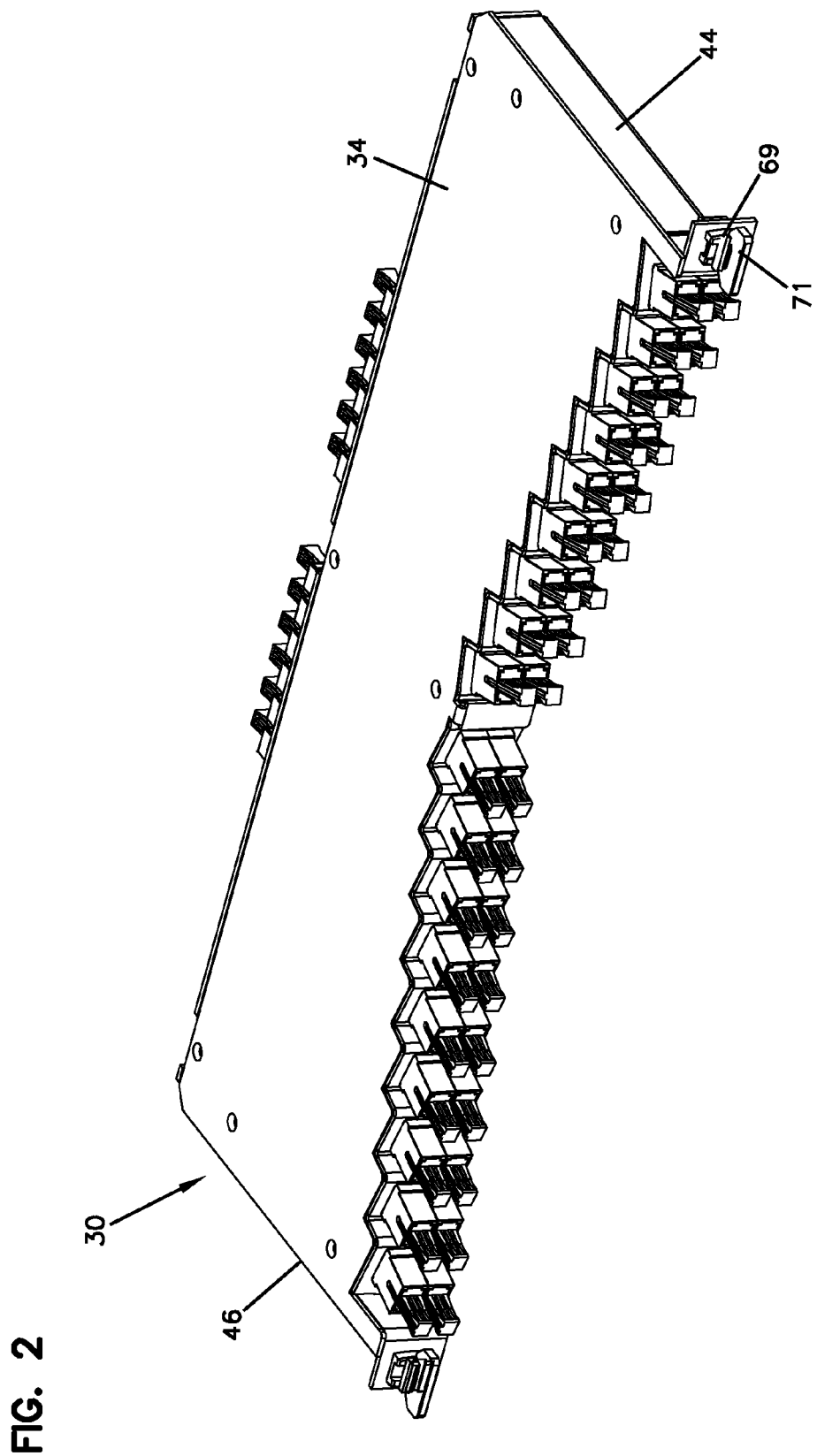
FIG. 2 is a front perspective view of one of the telecommunications modules of FIG. 1.
Figure 3:
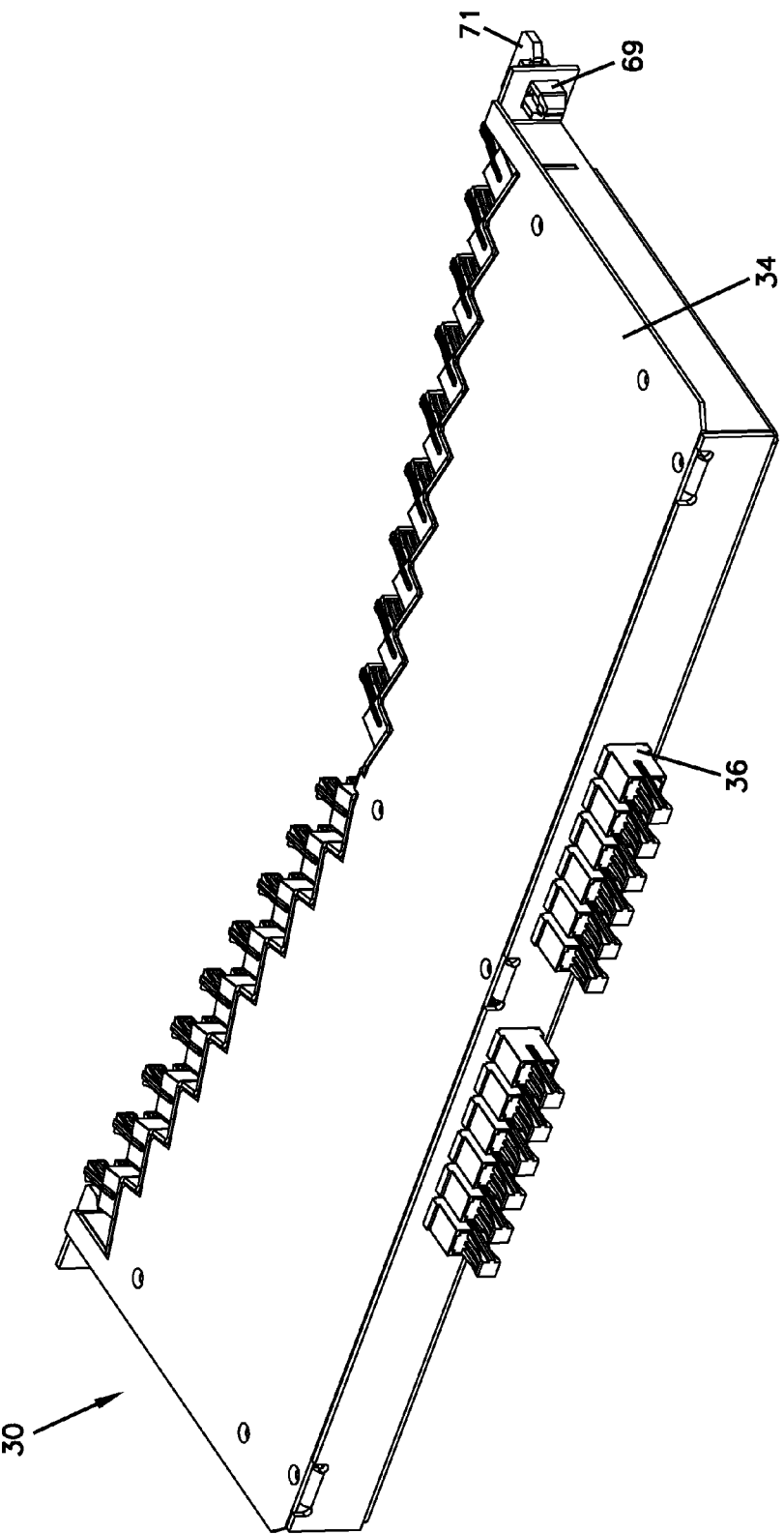
FIG. 3 is a rear perspective view of the telecommunications module of FIG. 2.

Referring now to the drawings, and in particular to FIG. 1, there is shown a fiber optic telecommunications system 10 including a telecommunications frame 20 with a plurality of telecommunications modules 30 inserted therein, the telecommunications modules 30 having features that are examples of inventive aspects according to the disclosure. The telecommunications module 30 is shown in isolation in FIGS. 2-8. The module 30 includes a module housing 32 and an attached cover plate 34 for covering an interior defined by the housing 32. As will be described in further detail below, the housing 32 may include one or more optical components that receive signals from connectors mounted to adapters 36 located at the front and rear faces of the module 30. The cover plate 34 is affixed to a top of the housing 32 and defines a top face 38 of the module housing 32. The cover plate 34 extends over two opposing sides, first and second sides 40, 42 (also referred to as right and left sides, respectively), of the housing 32. The plate 34 defines a first end 44 which extends over one side of the housing 32 and a second end 46 which extends over the opposite side of the housing 32. The first and second ends 44, 46 of the plate 34 that extend over the sides of the housing 32 define slide mounting flanges 48 for slidably mounting the telecommunications module 30 to another telecommunications device such as the telecommunications frame 20 shown in FIG. 1. Another example of a telecommunications frame that is configured to receive modules similar to those of the present disclosure is illustrated and described in U.S. Pat. No. 5,363,465, incorporated herein by reference in its entirety.

Figure 6:
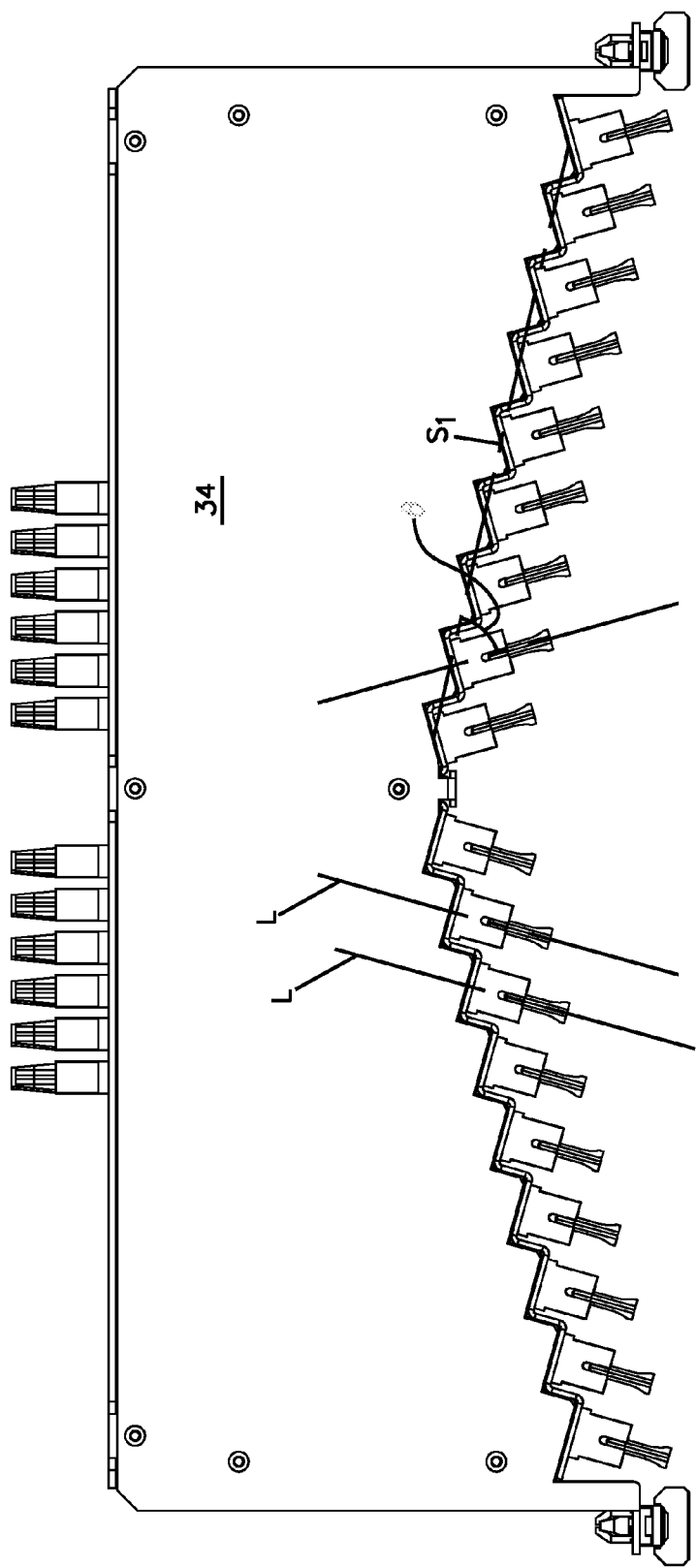
FIG. 6 is a top view of the telecommunications module of FIG. 2.
Figure 7:
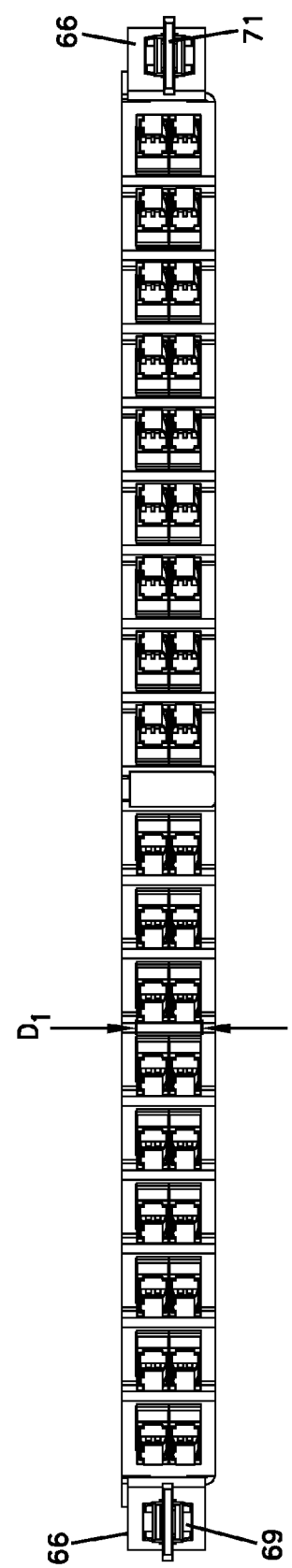
FIG. 7 is a front view of the telecommunications module of FIG. 2.
Figure 8:
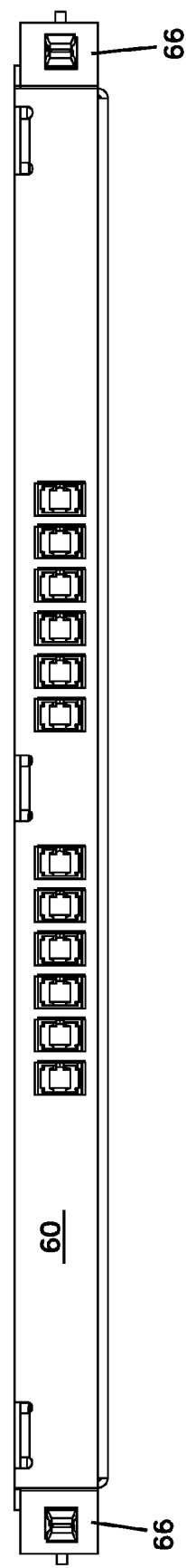
FIG. 8 is a rear view of the telecommunications module of FIG. 2.
Figure 9:
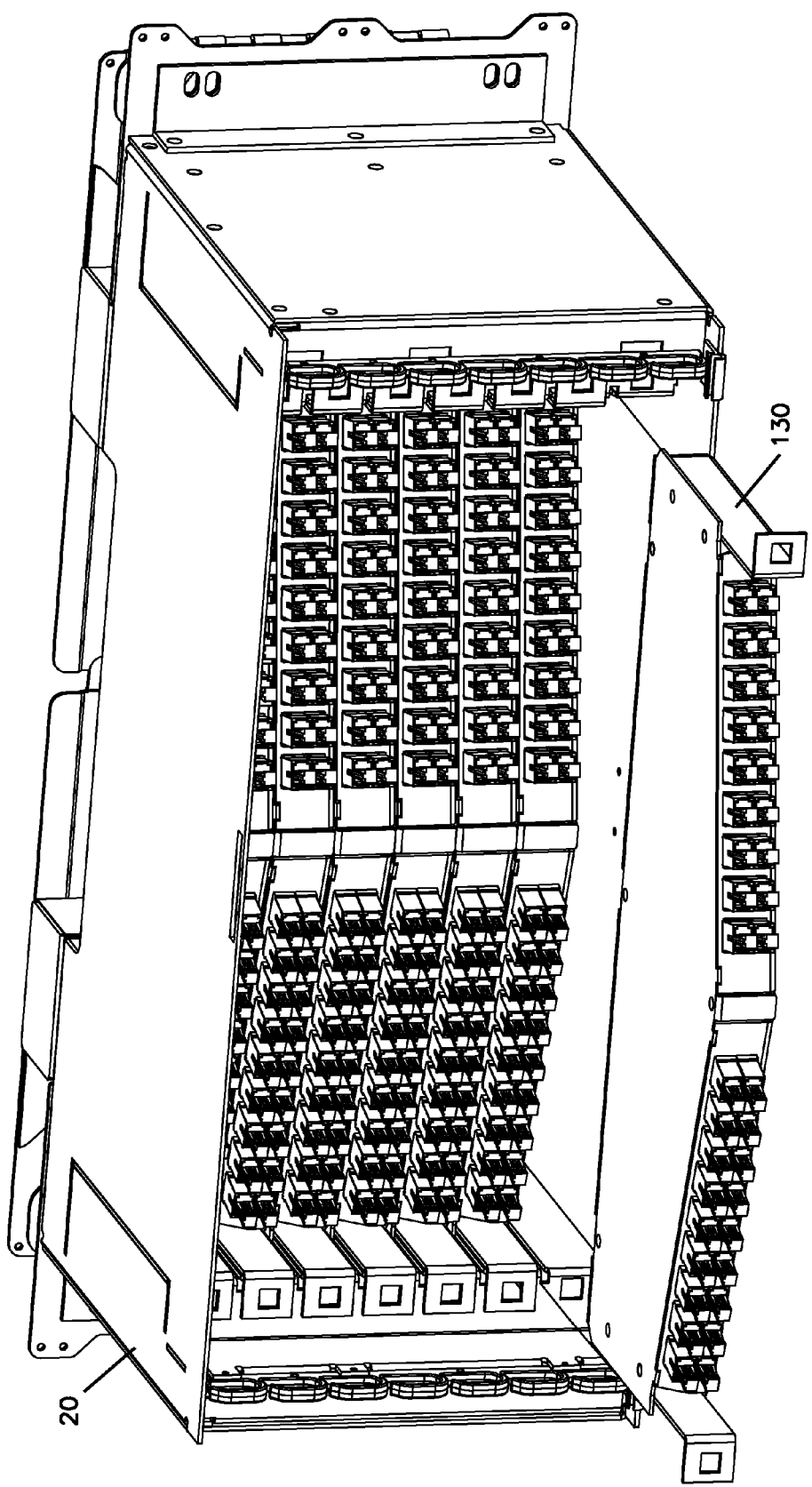
FIG. 9 is a front perspective view of a telecommunications system including a telecommunications frame and another embodiment of a telecommunications module mounted therein, the telecommunications module having features that are examples of inventive aspects according to the disclosure.
Figure 10:
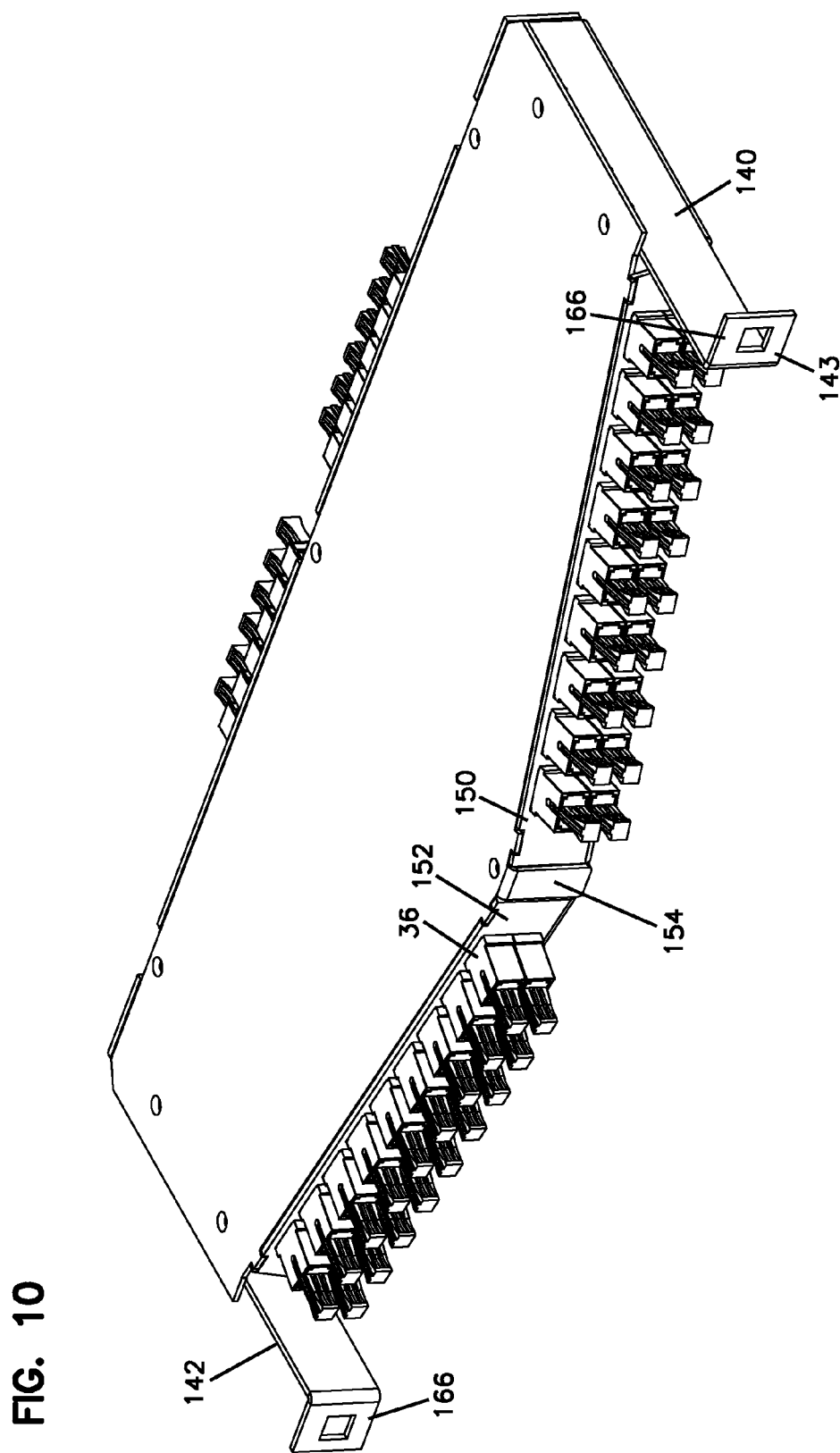
FIG. 10 is a front perspective view of the embodiment of the telecommunications module from FIG. 9.
Figure 11:
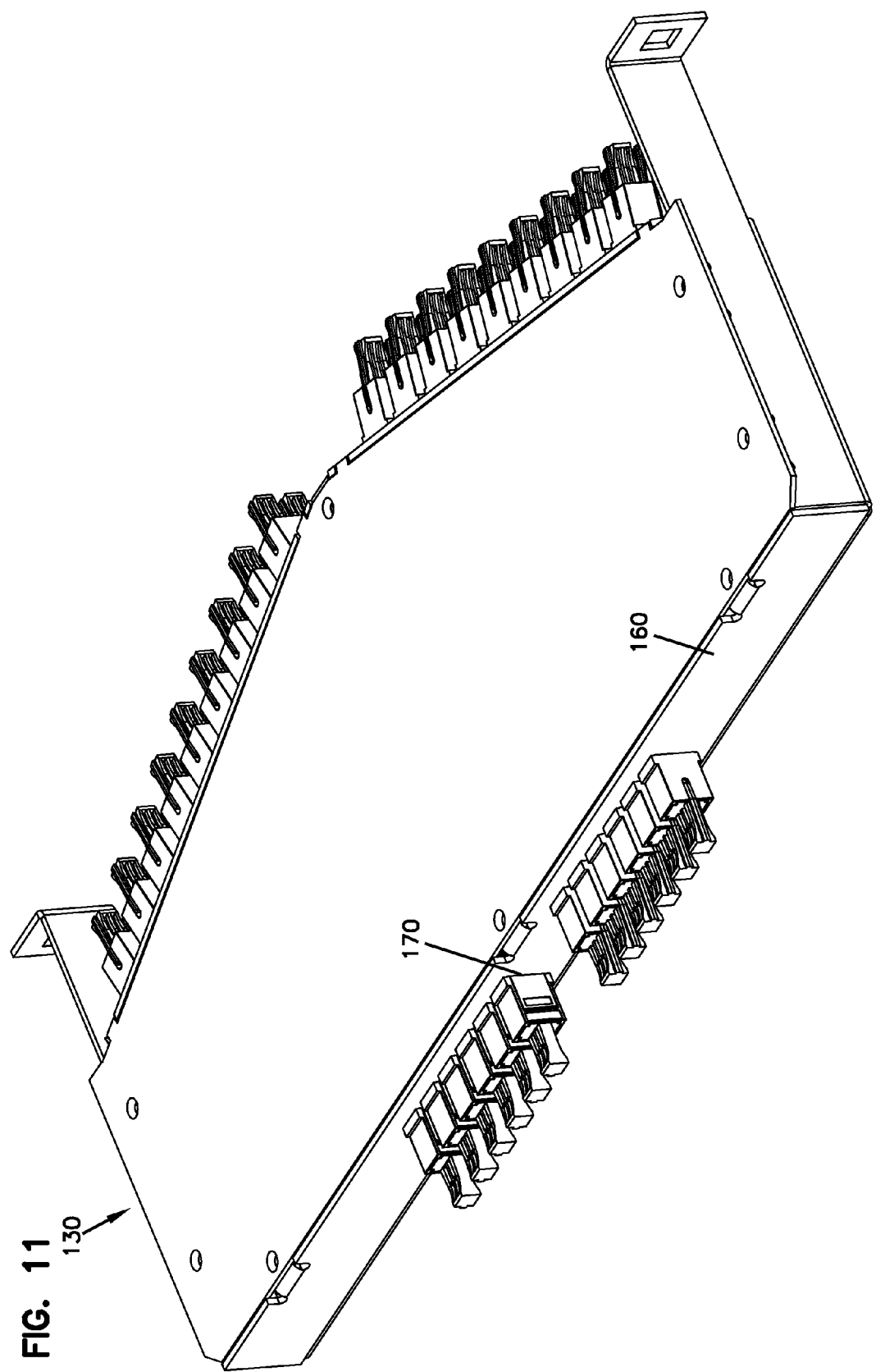
FIG. 11 is a rear perspective view of the telecommunications module of FIG. 10.
Figure 12:
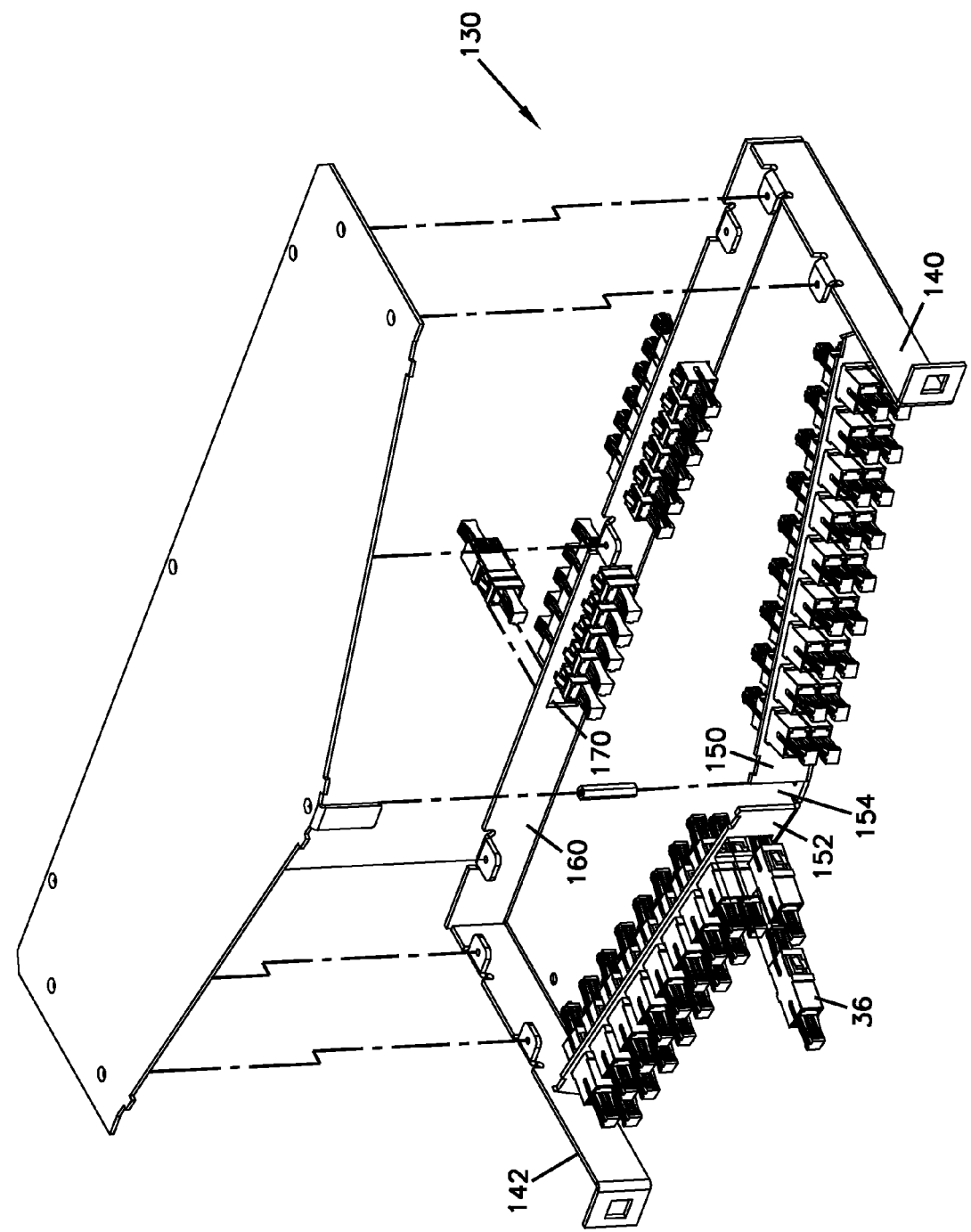
FIG. 12 is a front perspective exploded view of the telecommunications module of FIG. 10.
Figure 13:
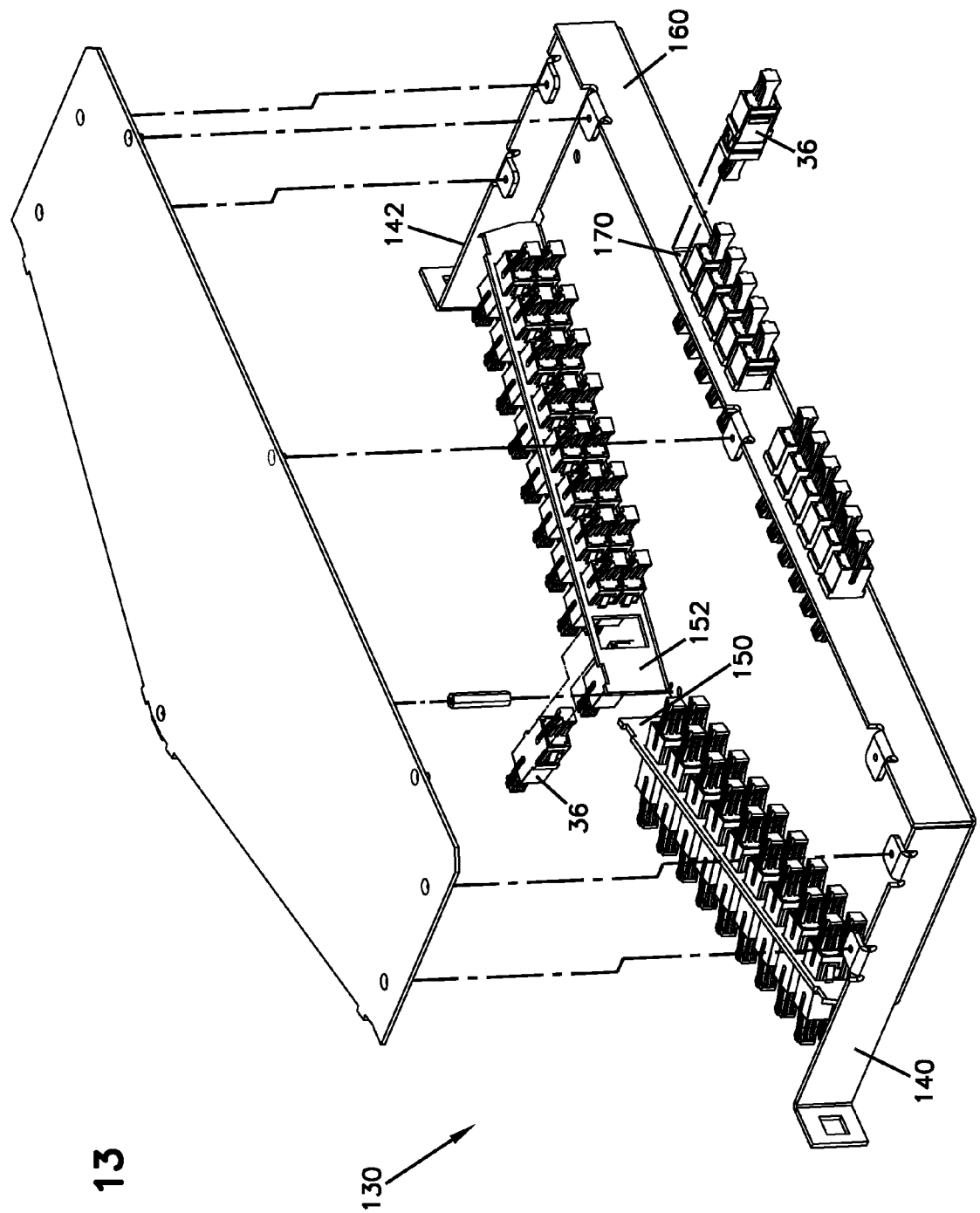
FIG. 13 is a rear perspective exploded view of the telecommunications module of FIG. 10.

The front of the telecommunications module is defined by a first plate 50 and a second plate 52 (also referred to as right and left plates, respectively) that are mounted by fasteners to the module housing 32. Each of the first plate 50 and the second plate 52 are angled forwardly as it extends from the center 54 of the front face of the module 30 toward the first side 40 and the second side 42, respectively. In this manner, the module 30 defines a greater depth (front to back) at the first and second sides 40, 42 than generally at the center portion 54. According to one embodiment, the first and the second plates 50, 52 are generally angled forwardly at an acute angle with respect to a line that is perpendicular to the sides 40, 42 of the module 30 as they extend from the center 54 of the front face toward the right and left sides 40, 42 of the module 30. Each plate generally defines a slope $S_1$ as it extends from the center portion 54 toward the right and left sides 40, 42 of the housing 32. The slope $S_1$ may be defined by a line connecting the centerpoints of adapter receptacles 58 of the plates 50, 52 as shown in FIG. 6. The right and left plates 50, 52 also define a stepped configuration as they extend from the center portion 54 toward the sides of the module housing 32. As will be described in further detail below, each step 56 in the stepped configuration defines the adapter receptacles 58 that are also angled at an acute angle θ with respect to the line that generally defines the slope $S_1$ of the angle of the right and left plates 50, 52 at the front of the module 30.

Figure 4:
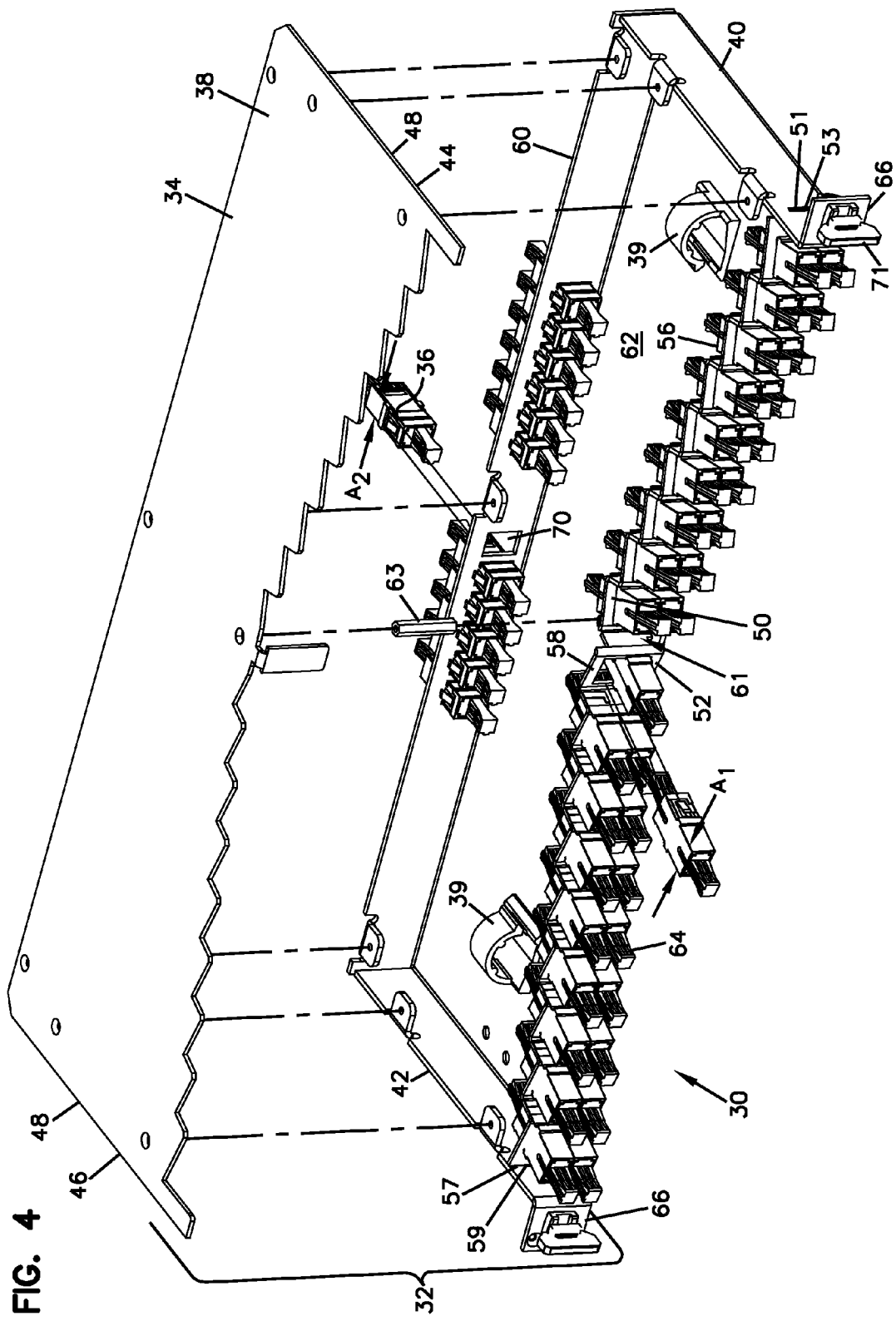
FIG. 4 is a front perspective exploded view of the telecommunications module of FIG. 2.
Figure 5:
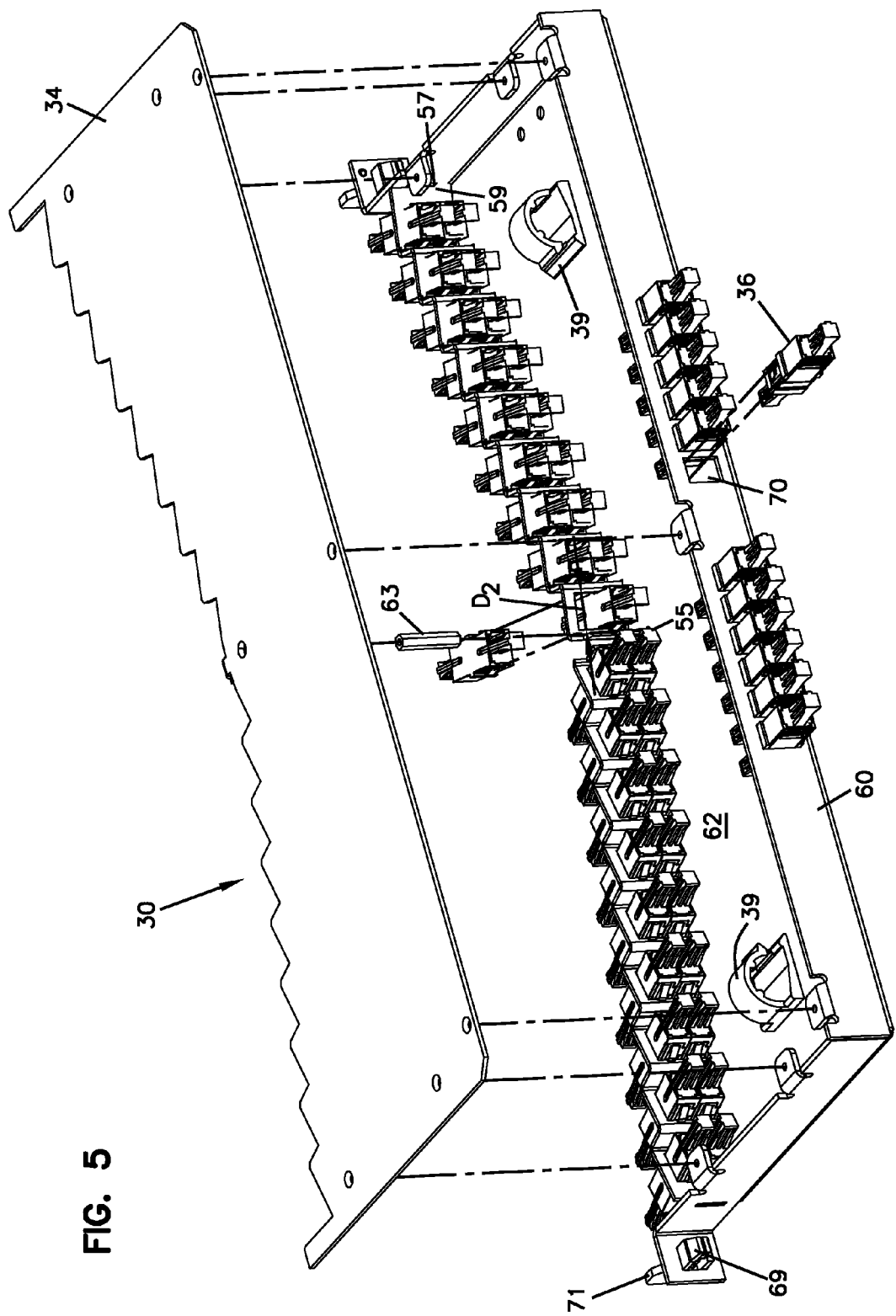
FIG. 5 is a rear perspective exploded view of the telecommunications module of FIG. 2.

Each of the first plate 50 and the second plate 52 are mounted to the module housing 32 by fasteners. As shown in FIGS. 4 and 5, the rightmost edge 51 of the first plate 50 is inserted into a slot 53 defined on the wall defining the right side 40 of the module housing 32 and a portion of the plate 50 is also inserted into a slot 55 defined by the base 62 of the housing on the leftmost end of the plate 50. Similarly, the leftmost edge 57 of the second plate 52 is inserted into a slot 59 defined on the wall defining the left side 42 of the module housing 32 and a portion of the plate 52 is also inserted into a slot 61 defined by the base 62 of the housing on the rightmost end of the plate 52. Once the plates 50, 52 are inserted into the slots defined by the base and the sides, the plates are captured with respect to the module housing 32 by the cover plate which is fastened to the base 62. A reinforcement fastener spacer 63 is provided adjacent the center portion of the front of the module 30 where the plates 50 and 52 meet.

Figure 5A:
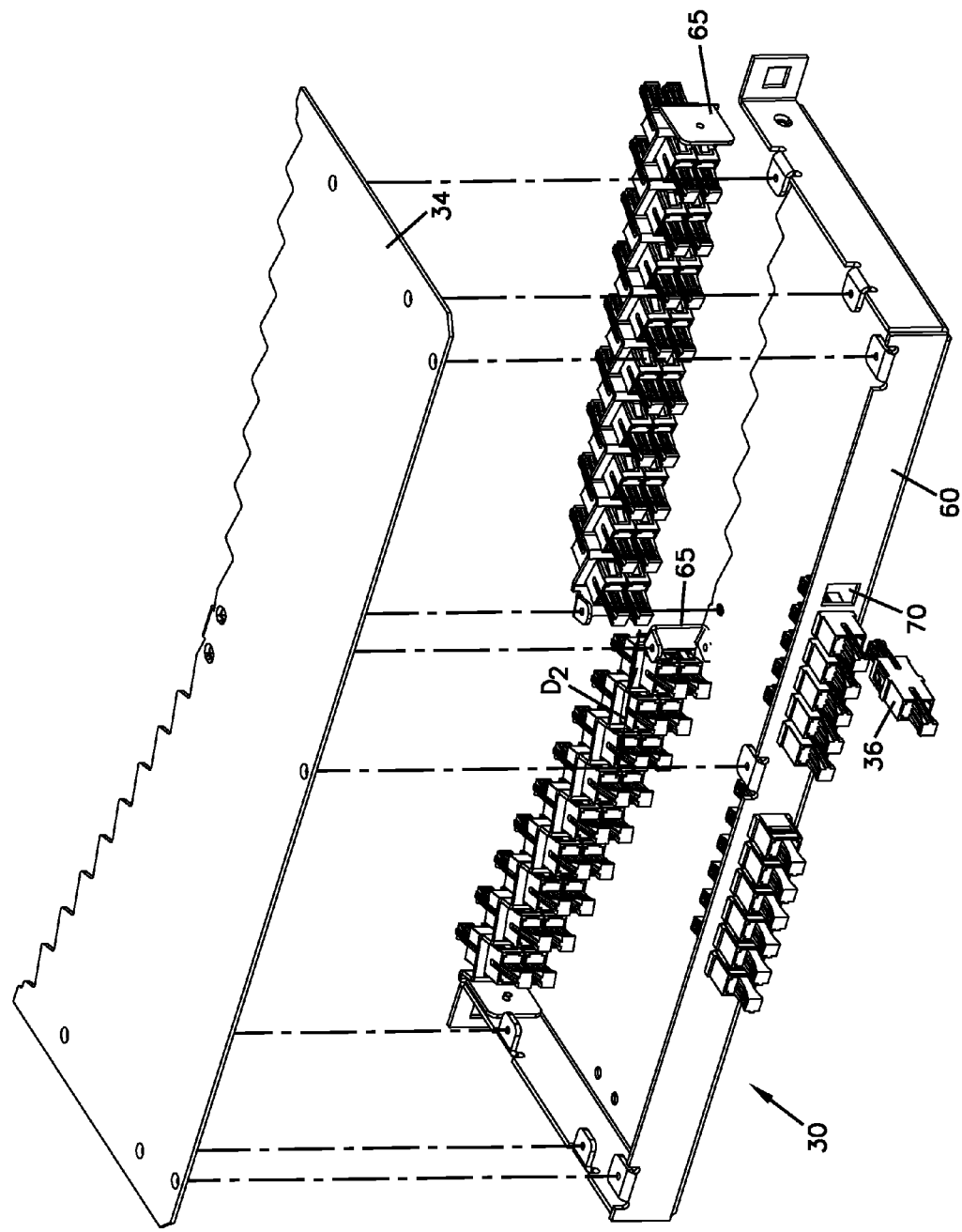
FIG. 5A illustrates the rear perspective exploded view of the telecommunications module of FIG. 4A that includes the alternative fastening arrangement for fastening the first and second plates to the module housing.

It should be noted that the fastening arrangement used to mount the plates 50 and 52 shown in the present application is simply one example embodiment and other arrangement may be used. For example, FIGS. 4A and 5A illustrate another fastening arrangement for mounting the plates 50 and 52. In the arrangement shown in FIGS. 4A and 5A, the plates 50 and 52 are not inserted into slots defined in the base 62 but include integral fastening flanges 65 at both ends of the plates for receiving fasteners.

The rear face 60 of the telecommunications module 30 is defined by a portion of the base 62 of the housing 32 that is bent upwardly. In the depicted embodiment, the rear face 60 extends straight across the back of the module 30 from the first side 40 to the second side 42, perpendicular to the first and second sides 40, 42 of the module 30.

The module 30 includes a number of fiber optic adapters 36 mounted to the first and second plates 50, 52 at the front of the module. It should be noted that the adapters 36 depicted herein are shown with dust caps 64. The dust caps 64 are removed prior to receiving fiber optic connectors. The adapters 36 in each plate are angled out in the preferred embodiment to aid in guiding fiber optic cables (not shown) through the module 30 so that the bending radius of the cables is not too sharp so as to cause damage to the cable. The adapters 36 are snapped into openings 58 of the first and second plates 50, 52. The adapters 36 are inserted so that they are angled to either side 40, 42 of the module housing 32. Cables within the module housing 32 may be managed by cable managers located within the module housing 32. An example cable management structure in the form of a flexible cable bundle tie-down 39 is shown in FIGS. 4 and 5. Other types of cable management structures may also be used.

As noted above, the angling of the fiber optic adapters 36 is provided by a stepped configuration of the front plates 50, 52. Each step 56 in the stepped configuration defines adapter receptacles 58 that are angled at an acute angle with respect to a line that generally defines the slope $S_1$ of the angle of the right and left plates 50, 52 of the front face. The adapters 36, even though angled with respect to the sides 40, 42 of the module 30, define longitudinal axes L that are parallel to each other (see FIG. 6).

The telecommunications module 30 also includes a pair of mounting flanges 66 at the front of the module 30 adjacent the first and second sides 40, 42 of the module housing 32. The mounting flanges 66 define apertures 68 for mounting locking structures. According to certain embodiments, the locking structures may include latches, such as swell latches 69, that are used to lock the module 30 to a telecommunications equipment such as a frame 20.

The operation of an example embodiment of a swell-latch is described in further detail in U.S. Pat. No. 5,363,465, which has been incorporated herein by reference in its entirety. Each swell latch is configured to engage an associated lock orifice, for example, in a forward wall of a telecommunications frame 20. According to an example embodiment, the swell-latch 69 might include a handle 71 which attaches to a central pin having a flattened end portion which has a greater height than width. The central pin engages an opposed pair of flanges. The flanges are normally spaced so as to fit through an associated lock orifice in the front wall of a telecommunications frame 20. When the rotatable handle 71 of the latch 69 is in a first position, the pin portion does not spread the flanges apart. In this manner, the front mounting flanges 66 can be pushed against the supporting frame 20 as the latch flanges fit through orifices of the frame 20.

Upon rotation of the handle 71, the central pin is rotated so that the flattened end section has its widened portion between the flanges. This spreads the flanges outward so that the module 30 is retained with respect to the frame 20. In this position, the distance between the spread flanges is sufficiently wide so that the latch will not fit through the orifices of the frame 20. In this manner, the module 30 is secured in the supporting frame 20.

As shown in FIGS. 1-7, the fiber optic adapters 36 provided on the front plates 50, 52 are provided in groups of two. The adapters 36 in the groups of two are in a stacked arrangement extending from a top of the module to the bottom of the module 30. The adapters 36 of the group of two are inserted, one on top of another, into adapter receptacles 58 defined on the first and second plates 50, 52.

Each adapter receptacle 58 includes a major dimension D1 and a minor dimension D2 wherein the major dimension D1 is greater than the minor dimension D2. The minor dimension D2 of the receptacle 58 generally corresponds to the major dimension A1 of a rectangular body of an SC-type fiber optic adapter 36. The major dimension D1 of the receptacle 58 is large enough to stack two adapters 36 on top of each other, wherein the adapters 36 are stacked such that the minor dimensions A2 of the rectangular adapter bodies are stacked along the major dimension D1 of the receptacle 58. According to one example embodiment, the telecommunications module 30 defines a 1 Rack Unit (1 RU) space between the top of the module 30 to the bottom of the module 30 in a standard telecommunications rack. 1 RU space is normally about 1.75" in standard telecommunications racks.

The adapters 36 are captured in the receptacles 58 by adapter spring clips, as described in further detail in U.S. Pat. No. 5,317,663, incorporated herein by reference in its entirety.

The rear face 60 of the telecommunications module 30 also defines receptacles 70 for mounting adapters 36. As noted above, the rear face 60 extends straight across the back of the module 30 from the first side 40 to the second side 42, with the adapters 36 defining longitudinal axes that are parallel to the first and second sides 40, 42 of the telecommunications module 30.

In the example shown in FIGS. 2-8, each front plate 50, 52 defines nine receptacles 58, with each receptacle 58 receiving two fiber optic adapters 36 on a stacked arrangement on top of one another, for a total of eighteen adapters. The entire front face of the module, thus, defines thirty-six connection locations.

In the depicted embodiment, the rear face 60 of the module 30 defines twelve adapter openings 70, with each opening 70 receiving one adapter 36.

It should also be noted that although the illustrated adapters 36 are configured to receive SC-type connectors, the front plates 50, 52 and the rear face 60 can be designed to interconnect other types of connectors.

As discussed above, the telecommunications module 30 can be used to house a variety of different types of optical equipment, depending upon the desired connectivity. Fiber optic equipment such as splitters, multiplexer/demultiplexers, attenuators, equalizers, converters may also be used within the module 30. External optical signals may enter the module 30 through sets of connectors going through the front adapters 36. The signals may be related to fiber optic equipment within the module 30 and exit the module 30 through sets of connectors that are connected through the adapters 36 are the rear of the module 30. Although the signal entry points are defined by the front adapters 36 and signal exit points are defined by the rear adapters 36, these signal entry and exit points can be reversed if desired or may be provided in different combination in the front and rear of the module 30.

FIGS. 9-16 illustrate another embodiment of a telecommunications module 130. The module 130 is similar to the module 30 illustrated in FIGS. 1-8 except for a number of differences. The module 130 includes a front face defined by a first portion 150 and a second portion 152 (also referred to as right portion and left portion, respectively). The first and second portions 150, 152, however, are oriented such that they angle inwardly (rearwardly) as they extend from a center portion 154 of the module 130 toward the first and second sides 140, 142, respectively. In this manner, the module 130 defines a greater depth (front to back) at the center portion 154 of the module 130 than at the first and second sides 140, 142. According to one embodiment, the right and the left portions 150, 152 of the front face are generally angled rearwardly at an acute angle β with respect to a line that is perpendicular to the sides 140, 142 of the module 130 as they extend from the center 154 toward the right and left sides 140, 142 of the module 130 (see FIG. 14). Each of the angled portions 150, 152 of the front face generally defines a slope $S_2$ as it extends from the center portion 154 toward the right and left sides 140, 142 of the housing 132. However, unlike the first embodiment, the angled front face portions 150, 152 are straight and do not include a stepped configuration. The adapters 36 are mounted to the first and second portions 150, 152 with the longitudinal axes L of the adapters 36 being perpendicular to the slopes/planes defined by the first and second front face portions 150, 152. Since the front face portions 150, 152 are angled rearwardly as they extend toward the sides 140, 142, the adapters 36 can be perpendicular and still provide the desired bend radius protection for the cables terminated to the connectors that are coupled to the adapters 36. Even though in the embodiment of the module illustrated in FIGS. 9-16, the first and second portions 150, 152 are depicted as integrally formed with the base of the module housing, in other embodiments, these portions may be provided as removable portions, such as those shown for the module of FIGS. 1-8.

As in the first embodiment, the rear face 160 of the module 130 is straight and defines twelve adapter openings 170, with each opening 170 receiving one adapter 36.

In the embodiment of the module 130, the right and left sidewalls 140, 142 of the module extend past the point where the first and second angled front portions 150, 152 meet the right and left sidewalls 140, 142. The front ends 143 of the extended right and left sidewalls 140, 142 are bent to define the front mounting flanges 166. The mounting flanges 166 are spaced forward of the point where the first and second angled front portions 150, 152 meet the right and left sidewalls 140, 142.

Figure 14:
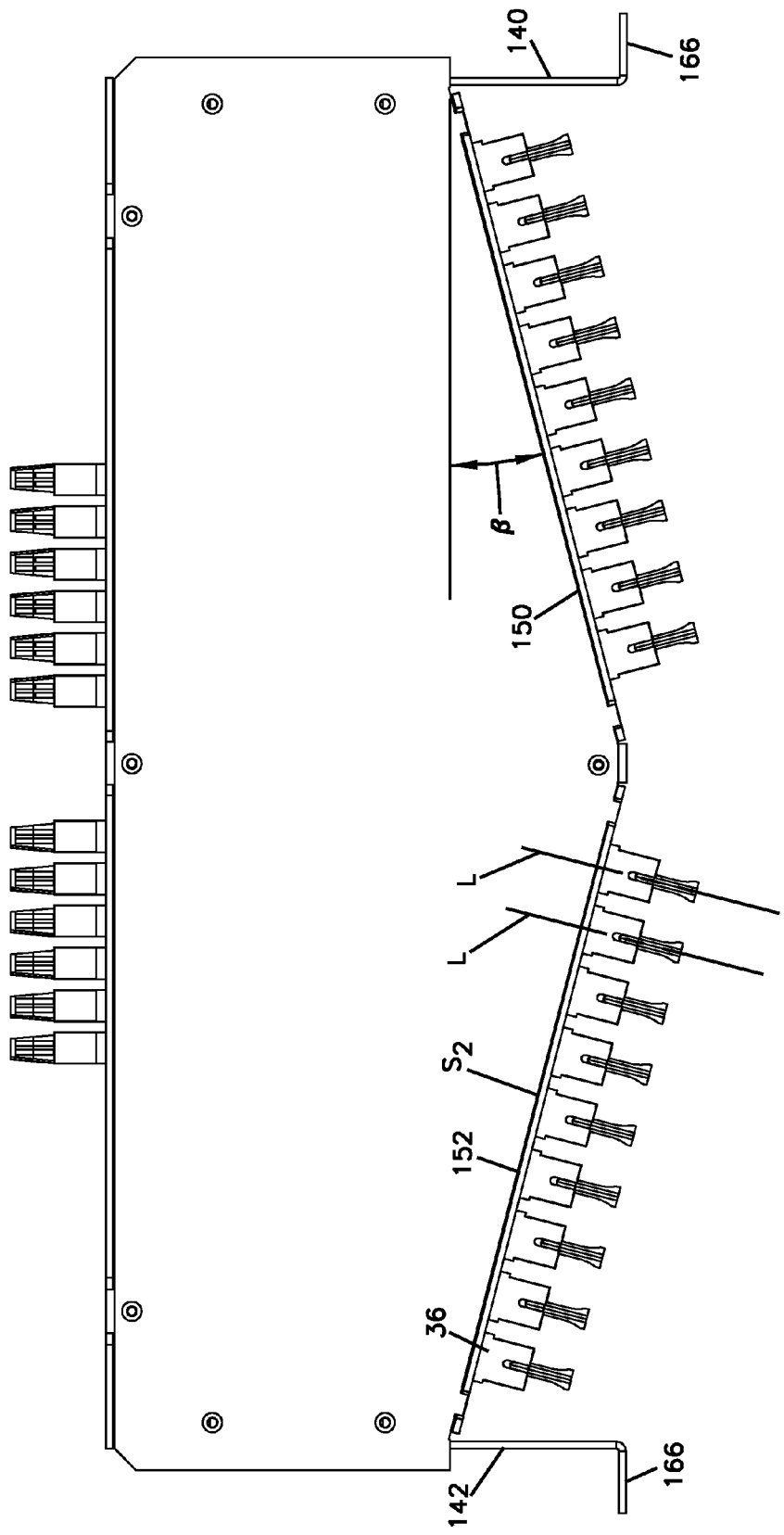
FIG. 14 is a top view of the telecommunications module of FIG. 10.
Figure 15:
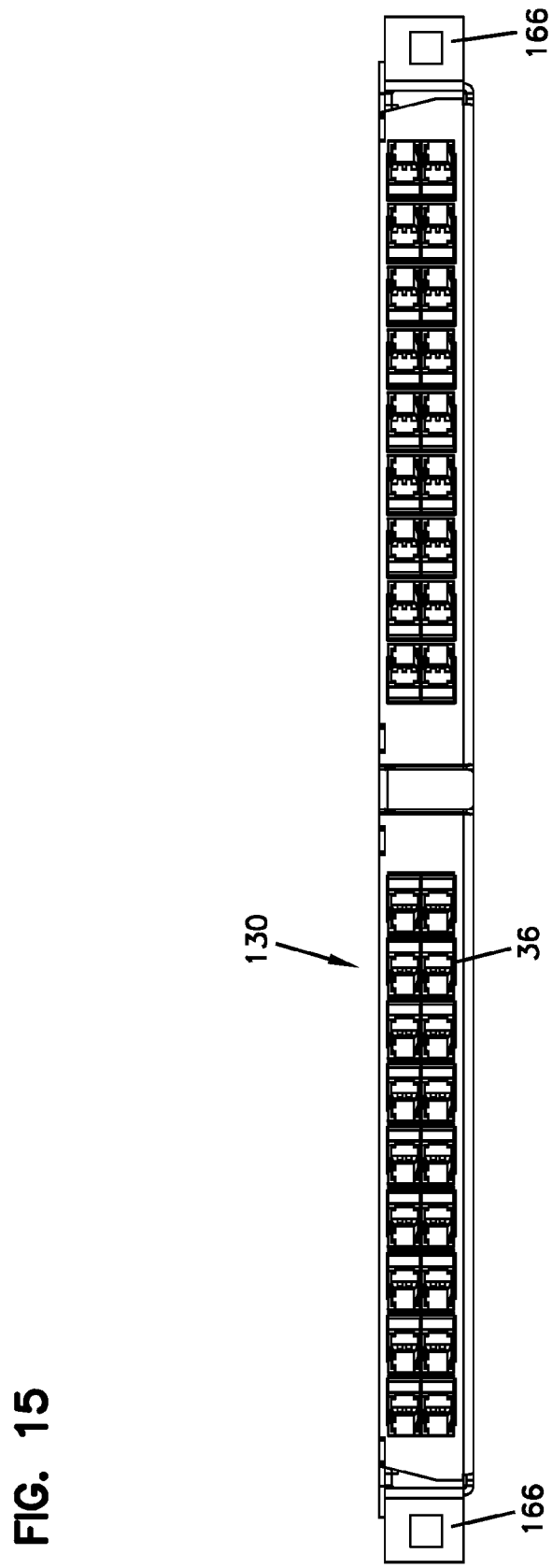
FIG. 15 is a front view of the telecommunications module of FIG. 10.
Figure 16:
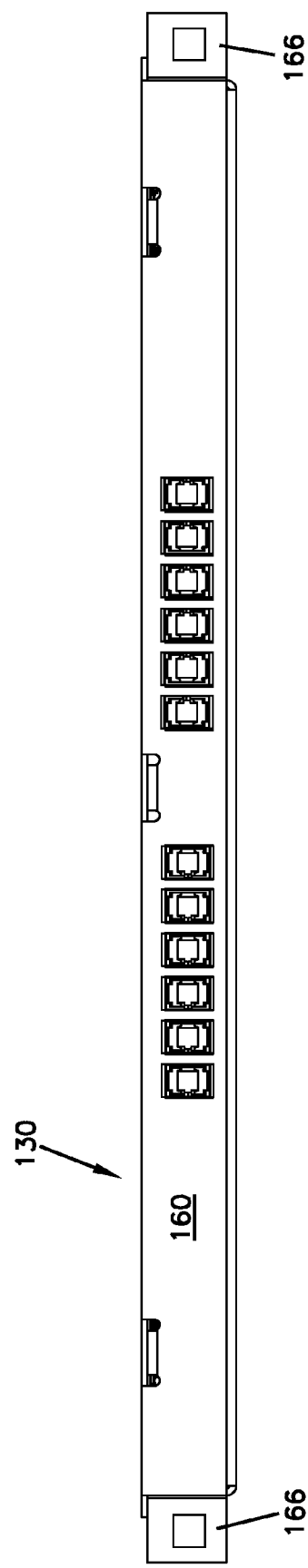
FIG. 16 is a rear view of the telecommunications module of FIG. 10.

The mounting flanges 166 are, however, positioned such that a line drawn across the flanges 166 lies generally flush with the center portion 154 of the front face of the module 130, as shown in FIG. 14. In this manner, even though the adapters 36 are at an angle, when the module 130 is slidably mounted and locked to a telecommunications frame 20, the forward-most portion of the module 130 does not extend past the mounting flanges 166 and interfere with other equipment.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application. For example, even though the modules 30, 130 are described as including a "top wall" and a "bottom wall", these walls might be defined as right and left walls if the modules are inserted into a frame vertically. Thus, such terms are used for ease of description and no restriction is intended by such use of the terms.

The above specification, examples and data provide a complete description of the inventive aspects of the disclosure. Many embodiments of the disclosure can be made without departing from the spirit and scope of the inventive aspects of the disclosure.

The invention claimed is:

1. A telecommunications module comprising:
   a module housing defining a base wall, a right wall, a left wall, a front face, a rear face, and a removable top cover cooperating with the base wall, the right wall, the left wall, and the front and rear faces to define an interior of the module;
   the front face defining a centerpoint, a right portion extending generally from the centerpoint to the right wall and a left portion extending generally from the centerpoint to the left wall, wherein the right and left portions are generally angled forwardly as they extend from the centerpoint toward the right and left walls of the module housing, respectively, the angle being an acute angle relative to a line that is perpendicular to the right and left walls of the module housing; and
   a plurality of adapters mounted to the front face, the adapters are provided in groups of two and are stacked in a direction extending from the removable top cover to the base wall of the module housing, the adapters mounted at receptacles defined on the right and left portions of the front face;
   wherein each of the right and left portions of the front face defines a slope as it extends from the centerpoint toward the right and left walls of the module housing, respectively, the angled right and left portions of the front face each defining a stepped configuration as they extend from the centerpoint toward the right and left walls of the module housing, respectively, such that each step in the stepped configuration defines the adapter receptacles;
   wherein the adapter receptacles define longitudinal axes that are parallel to each other and are also all at an acute angle with respect to a line that generally defines the slope of the angle of the right and left portions of the front face.

2. A telecommunications module according to claim 1, wherein the slope of the right and left portions of the front face are defined by connecting the centerpoint of the adapter receptacles.

3. A telecommunications module according to claim 1, further comprising thirty-six adapters mounted to the front face of the module, with eighteen adapters mounted in each of the right and left angled portions of the front face.

4. A telecommunications module according to claim 1, further comprising a plurality of adapters mounted to the rear face of the module.

5. A telecommunications module according to claim 1, wherein the right and left portions of the front face are defined by removable plates that are captured with respect to the module housing by the removable top cover.

6. A telecommunications module according to claim 1, wherein the adapters are SC-type fiber optic adapters.

7. A telecommunications module according to claim 6, wherein each adapter receptacle includes a major dimension and a minor dimension wherein the major dimension is greater than the minor dimension, the minor dimension of the receptacle generally corresponding to the major dimension of a rectangular body of an SC-type fiber optic adapter, wherein the two SC-type fiber optic adapters are stacked in each receptacle such that minor dimensions of the rectangular body of the SC-type fiber optic adapters are stacked along the major dimension of the receptacle.

8. A telecommunications module according to claim 1, wherein the module housing defines generally a 1 Rack Unit (1 RU) space between the top cover of the module housing and the base wall in a standard telecommunications rack.

9. A telecommunications module according to claim 1, further comprising a cable management structure located within the interior of the module housing.

10. A telecommunications module according to claim 1, further comprising a mounting flange adjacent each of the right wall and the left wall, each mounting flange including a swell latch.

11. A telecommunications system comprising:
    a frame;
    a plurality of modules slidably inserted into the frame, each module comprising:
       a module housing defining a base wall, a right wall, a left wall, a front face, a rear face, and a removable top cover cooperating with the base wall, the right wall, the left wall, and the front and rear faces to define an interior of the module;
       the front face defining a centerpoint, a right portion extending generally from the centerpoint to the right wall and a left portion extending generally from the centerpoint to the left wall, wherein the right and left portions are generally angled forwardly as they extend from the centerpoint toward the right and left walls of the module housing, respectively, the angle being an acute angle relative to a line that is perpendicular to the right and left walls of the module housing; and
       a plurality of adapters mounted to the front face, the adapters are provided in groups of two and are stacked in a direction extending from the removable top cover to the base wall of the module housing, the adapters mounted at receptacles defined on the right and left portions of the front face;
    wherein each of the right and left portions of the front face defines a slope as it extends from the centerpoint toward the right and left walls of the module housing, respectively, the angled right and left portions of the front face each defining a stepped configuration as they extend from the centerpoint toward the right and left walls of the module housing, respectively, such that each step in the stepped configuration defines the adapter receptacles;
    wherein the adapter receptacles define longitudinal axes that are parallel to each other and are also all at an acute angle with respect to a line that generally defines the slope of the angle of the right and left portions of the front face.

12. A telecommunications system according to claim 11, wherein the module housing defines generally a 1 Rack Unit (1 RU) space between the top cover of the module housing and the base wall in a standard telecommunications rack.

13. A telecommunications system according to claim 12, further comprising six modules slidably inserted into the frame.

14. A telecommunications system according to claim 11, wherein each module is locked with respect to the frame with a swell latch located on each of right and left mounting flanges of the module housing.

15. A telecommunications module comprising:
a module housing defining a base wall, a right wall, a left wall, a front face, a rear face, and a removable top cover cooperating with the base wall, the right wall, the left wall, and the front and rear faces to define an interior of the module;
the front face defining a centerpoint, a right portion extending generally from the centerpoint to the right wall and a left portion extending generally from the centerpoint to the left wall, wherein the right and left portions are generally angled rearwardly as they extend from the centerpoint toward the right and left walls of the module housing, respectively, the angle being an acute angle relative to a line that is perpendicular to the right and left walls of the module housing; and
a plurality of SC-type fiber optic adapters mounted to the front face, wherein the SC-type fiber optic adapters are provided in groups of two and are stacked in a direction extending from the removable top cover to the base wall of the module housing, the SC-type fiber optic adapters mounted at receptacles defined on the right and left portions of the front face;
wherein each of the right and left portions of the front face defines a slope as it extends from the centerpoint toward the right and left walls of the module housing, respectively, wherein the adapter receptacles define longitudinal axes that are parallel to each other and are also all perpendicular with respect to a line that generally defines the slope of the angle of the right and left portions of the front face; and
wherein each adapter receptacle includes a major dimension and a minor dimension wherein the major dimension is greater than the minor dimension, the minor dimension of the receptacle generally corresponding to the major dimension of a rectangular body of the SC-type fiber optic adapter, wherein the two SC-type fiber optic adapters are stacked in each receptacle such that minor dimensions of the rectangular body of the SC-type fiber optic adapters are stacked along the major dimension of the receptacle.

16. A telecommunications module according to claim 15, further comprising thirty-six SC-type fiber optic adapters mounted to the front face of the module, with eighteen SC-type fiber optic adapters mounted in each of the right and left angled portions of the front face.

17. A telecommunications module according to claim 15, further comprising a plurality of SC-type fiber optic adapters mounted to the rear face of the module.

18. A telecommunications module according to claim 15, wherein the module housing defines generally a 1 Rack Unit (1 RU) space between the top cover of the module housing and the base wall in a standard telecommunications rack.

19. A telecommunications module according to claim 15, further comprising a mounting flange adjacent each of the right wall and the left wall of the module housing.

20. A telecommunications system comprising:
a frame;
a plurality of modules slidably inserted into the frame, each module comprising:
a module housing defining a base wall, a right wall, a left wall, a front face, a rear face, and a removable top cover cooperating with the base wall, the right wall, the left wall, and the front and rear faces to define an interior of the module;
the front face defining a centerpoint, a right portion extending generally from the centerpoint to the right wall and a left portion extending generally from the centerpoint to the left wall, wherein the right and left portions are generally angled rearwardly as they extend from the centerpoint toward the right and left walls of the module housing, respectively, the angle being an acute angle relative to a line that is perpendicular to the right and left walls of the module housing; and
a plurality of SC-type fiber optic adapters mounted to the front face, wherein the SC-type fiber optic adapters are provided in groups of two and are stacked in a direction extending from the removable top cover to the base wall of the module housing, the SC-type fiber optic adapters mounted at receptacles defined on the right and left portions of the front face;
wherein each of the right and left portions of the front face defines a slope as it extends from the centerpoint toward the right and left walls of the module housing, respectively, wherein the adapter receptacles define longitudinal axes that are parallel to each other and are also all perpendicular with respect to a line that generally defines the slope of the angle of the right and left portions of the front face; and
wherein each adapter receptacle includes a major dimension and a minor dimension wherein the major dimension is greater than the minor dimension, the minor dimension of the receptacle generally corresponding to the major dimension of a rectangular body of the SC-type fiber optic adapter, wherein the two SC-type fiber optic adapters are stacked in each receptacle such that minor dimensions of the rectangular body of the SC-type fiber optic adapters are stacked along the major dimension of the receptacle.

21. A telecommunications system according to claim 20, wherein the module housing defines generally a 1 Rack Unit (1 RU) space between the top cover of the module housing and the base wall in a standard telecommunications rack.

22. A telecommunications system according to claim 21, further comprising six modules slidably inserted into the frame.

* * * * *